UNITED STATES PATENT OFFICE.

OTTO SOHST, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

TRISULFONIC ACID OF THE SAFRANIN SERIES AND PROCESS OF MAKING SAME.

1,015,354.     Specification of Letters Patent.     Patented Jan. 23, 1912.

No Drawing.     Application filed December 17, 1910. Serial No. 597,796.

*To all whom it may concern:*

Be it known that I, OTTO SOHST, Ph. D., chemist, a citizen of the Empire of Germany, residing at Höchst-on-the-Main, Germany, have invented certain new and useful Improvements in Trisulfonic Acids of the Safranin Series and Processes of Making Same, of which the following is a specification.

I have found that valuable dyestuffs can be obtained by simultaneous oxidation of p-amino-diphenyl-amin-sulfonic acids, their homologues or substitution products, with sulfonic acids of primary amins and monosulfonic acids of the tertiary amins with a free para position, for instance the alkylbenzylanilin-sulfonic acids, which can be easily procured technically. Thus dyestuffs are obtained having the general formula:

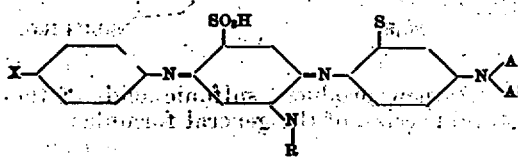

wherein X stands for hydrogen, a methyl-, alkoxyl-, acidylamino-, or other similar neutral group; R for an arylmonosulfonic acid; S for a sulfo group or hydrogen; A for a methyl-, or ethyl group; and A¹ for a methyl-group, ethyl-group, benzyl-group, or benzylsulfonic acid group. These dyestuffs are distinguished by their beautiful blue tint and they possess the valuable property of dyeing wool in a bath prepared with a mineral acid, and leaving white the intermixed cotton fibers dyed at the same time.

Example I: A mixture of 14 gr. of p-tolyl-p-phenylenediaminsulfonic acid, 17 gr. of sodium-salt of ethyl-benzylmetanilic acid, and 5 gr. of sodium carbonate, is dissolved in water; this solution is cooled down to 5° C. and then a solution of 10 gr. of sodium bichromate, 10 gr. of hydrochloric acid and 10 gr. of acetic acid, added to it. After having stirred for two hours, during which operation the temperature has risen to 10° C., the mass is neutralized with 25 gr. of chalk and 11 gr. of sodium salt of sulfanilic acid, and 10 gr. of sodium bichromate are added to it. This mixture is stirred for another two hours at ordinary temperature, then heated to boiling, and as soon as its coloration does not change any more it is filtered in the heat and the filtrate salted out. The reaction involved may be explained by the following equation:

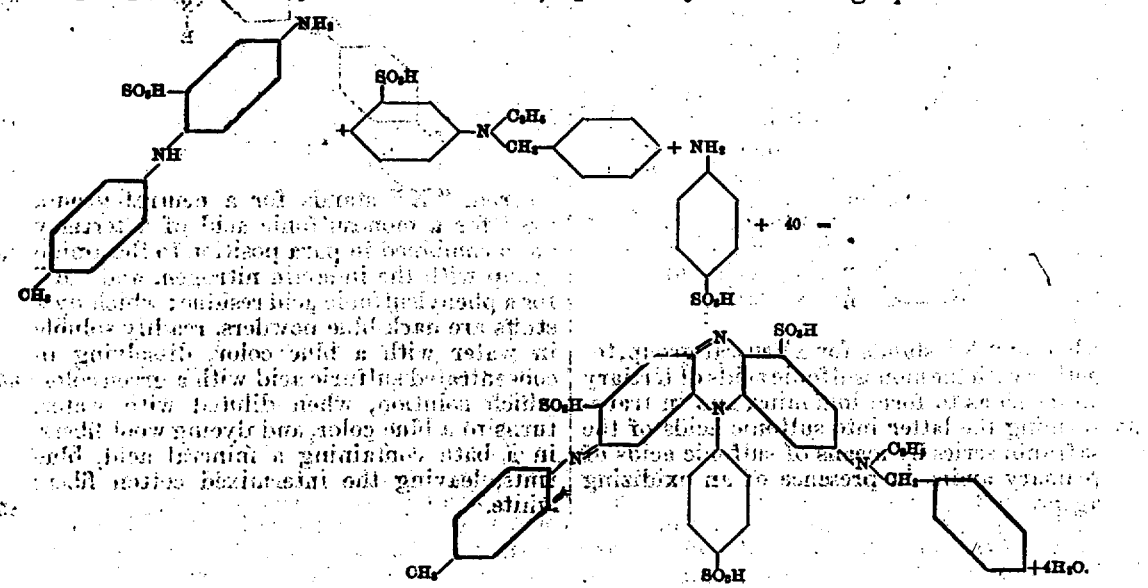

The dyestuff precipitates in the form of crystals having a brass-like luster. When dried and ground it forms a dark powder of a metallic luster readily dissolving in water to a blue solution. Its solution in concentrated sulfuric acid is green and turns blue on being diluted with water. It dyes wool in a bath prepared with a mineral acid, blue tints.

Example II: A mixture of 15 gr. of p-ethoxyphenyl - p - phenylenediaminsulfonic acid, 15 gr. of ethylbenzylanilinsulfonic acid and 10 gr. of sodium carbonate is dissolved in water, this solution is cooled down to about 5° C. and there is added to it, while stirring, a solution of 10 gr. of sodium bichromate and 10 gr. of hydrochloric acid. To this mixture 10 gr. of acetic acid are added and the mass is stirred for two hours, during which operation the temperature rises to 10° C. After the green solution has been neutralized with 25 gr. of chalk, there are added to it first a solution of 11 gr. of sodium salt of sulfanilic acid and then a solution of 10 gr. of sodium bichromate; the resulting mass is stirred for about another 1-2 hours, then heated to boiling, and as soon as no further change of the coloration is perceptible, it is filtered and the filtrate saturated with common salt, whereupon the dyestuff precipitates as a soft, resinous mass. The reaction involved may be explained by the following equation:

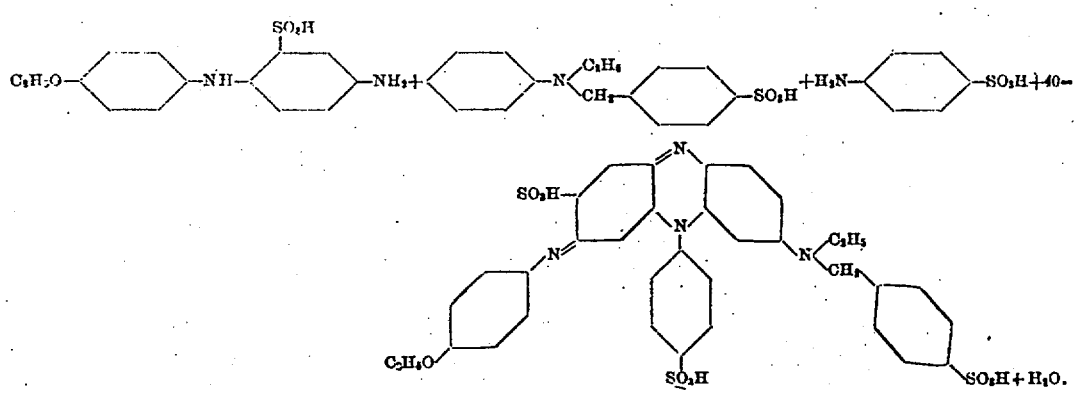

When dried and ground the product forms a dark powder of a metallic luster, which is readily soluble in water to a blue solution and which dyes wool, in a bath prepared with a mineral acid, blue tints. Its solution in concentrated sulfuric acid is green, and turns blue on being diluted with water.

Having now particularly described my invention, what I claim is:

1. The process of manufacturing sulfonic acids of the safranin series, which consists in oxidizing p-aminodiphenylamin-monosulfonic acid of the general formula:

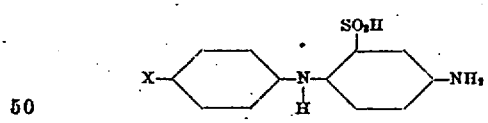

wherein "X" stands for a neutral group, together with the monosulfonic acids of tertiary amins so as to form indamins, and in transforming the latter into sulfonic acids of the safranin series by means of sulfonic acids of primary amins in presence of an oxidizing agent.

2. As new products, sulfonic acids of the safranin series, of the general formula:

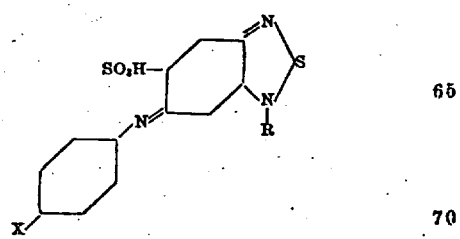

wherein "X" stands for a neutral group, "S" for a monosulfonic acid of a tertiary amin combined in para position to the amino group with the indamin nitrogen, and "R" for a phenylsulfonic acid residue; which dyestuffs are dark-blue powders, readily soluble in water with a blue color, dissolving in concentrated sulfuric acid with a green color, which solution, when diluted with water, turns to a blue color, and dyeing wool fibers, in a bath containing a mineral acid, blue tints, leaving the intermixed cotton fibers white.

3. As a new product, the dyestuff of the formula:

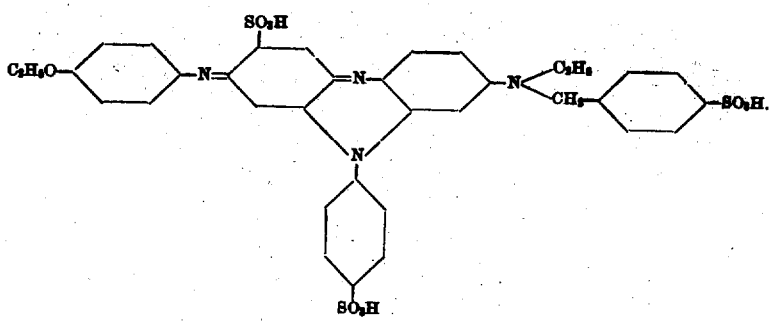

which dyestuff is a dark-blue powder, readily soluble in water with a blue color, dissolving in concentrated sulfuric acid with a green color, which solution, when diluted with water, turns to a blue color, and dyeing wool fibers, in a bath containing a mineral acid, blue tints, leaving the intermixed cotton fibers white.

In testimony whereof, I affix my signature in presence of two witnesses.

OTTO SOHST.

Witnesses:
JEAN GRUND,
CARL GRUND.

Copies of this patent may be obtained for five cents each, by addressing the "Commissioner of Patents, Washington, D. C."

---

Correction in Letters Patent No. 1,015,354.

It is hereby certified that in Letters Patent No. 1,015,354, granted January 23, 1912, upon the application of Otto Sohst, of Höchst-on-the-Main, Germany, for an improvement in "Trisulfonic Acid of the Safranin Series and Processes of Making Same," an error appears in the printed specification requiring correction as follows: Lines 20–25, formula, for

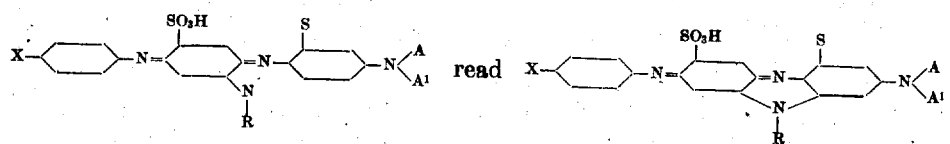

and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*

3. As a new product, the dyestuff of the formula:

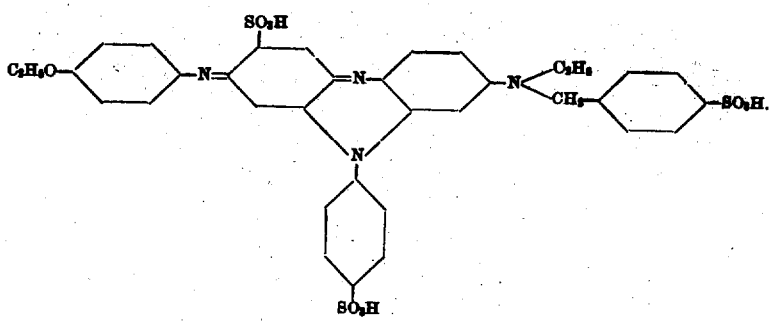

which dyestuff is a dark-blue powder, readily soluble in water with a blue color, dissolving in concentrated sulfuric acid with a green color, which solution, when diluted with water, turns to a blue color, and dyeing wool fibers, in a bath containing a mineral acid, blue tints, leaving the intermixed cotton fibers white.

In testimony whereof, I affix my signature in presence of two witnesses.

OTTO SOHST.

Witnesses:
JEAN GRUND,
CARL GRUND.

Copies of this patent may be obtained for five cents each, by addressing the "Commissioner of Patents, Washington, D. C."

---

Correction in Letters Patent No. 1,015,354.

It is hereby certified that in Letters Patent No. 1,015,354, granted January 23, 1912, upon the application of Otto Sohst, of Höchst-on-the-Main, Germany, for an improvement in "Trisulfonic Acid of the Safranin Series and Processes of Making Same," an error appears in the printed specification requiring correction as follows: Lines 20–25, formula, for

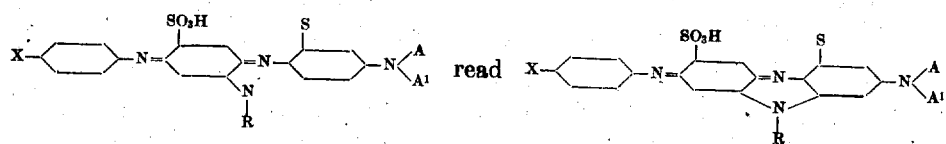

and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*

It is hereby certified that in Letters Patent No. 1,015,354, granted January 23, 1912, upon the application of Otto Sohst, of Höchst-on-the-Main, Germany, for an improvement in "Trisulfonic Acid of the Safranin Series and Processes of Making Same," an error appears in the printed specification requiring correction as follows: Lines 20-25, formula, for

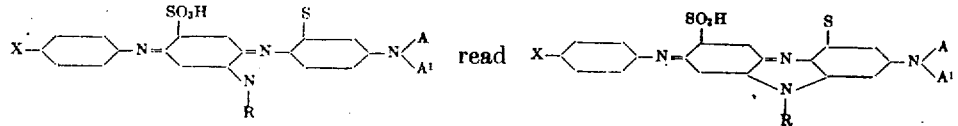

and that the said Letters Patent should be read with this correction therein that the same may conform to the record of the case in the Patent Office.

Signed and sealed this 11th day of June, A. D., 1912.

[SEAL.]

C. C. BILLINGS,
*Acting Commissioner of Patents.*